Figure 6:
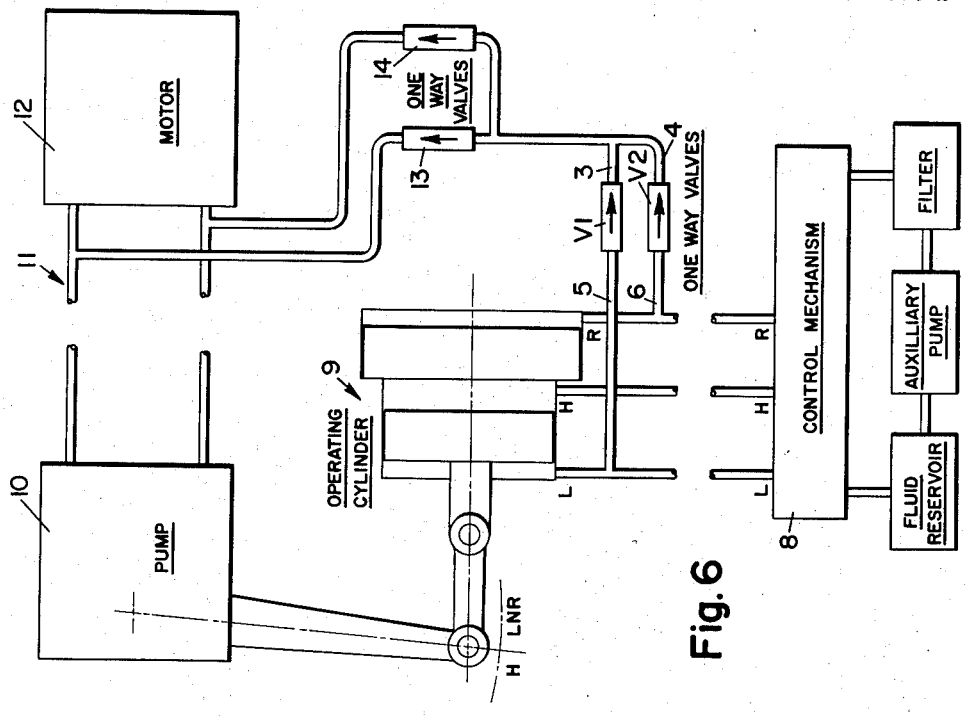

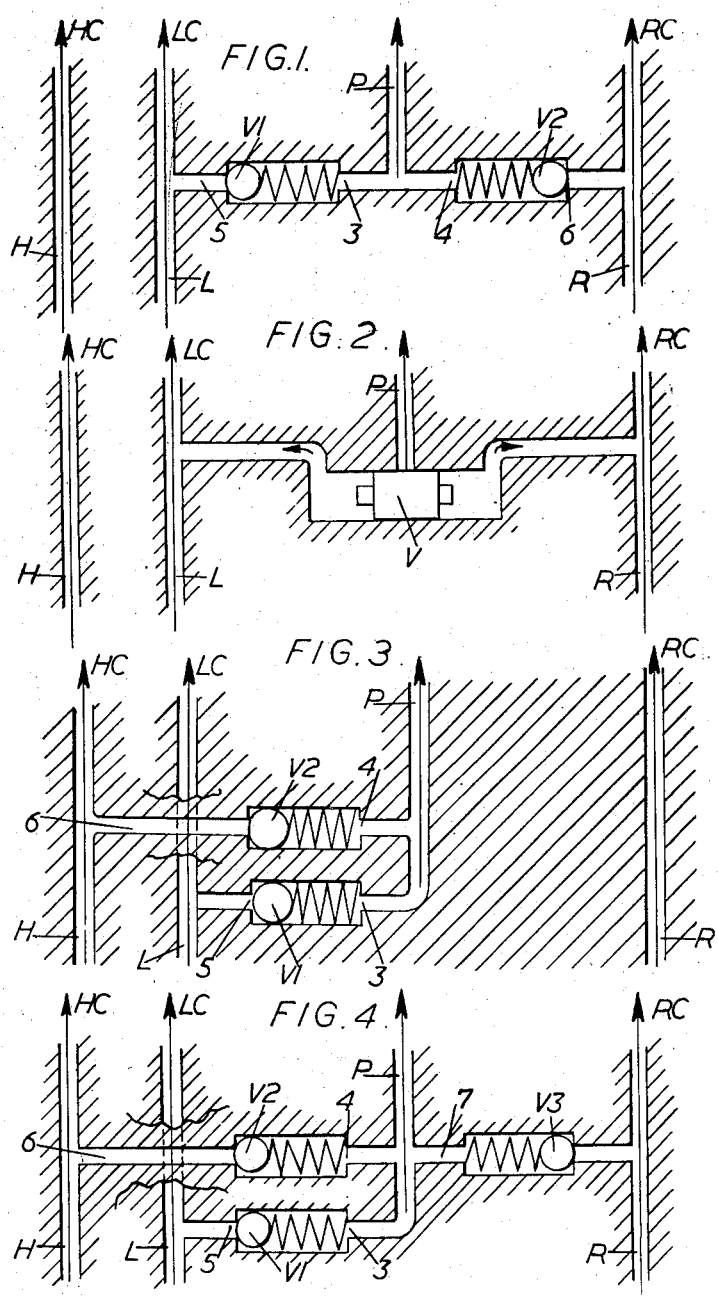

April 23, 1963 G. D. PAGE 3,086,364
HYDROSTATIC POWER TRANSMISSIONS
Filed June 3, 1960 2 Sheets-Sheet 2

INVENTOR
GRAHAM DESBOROUGH PAGE

BY  *Scrivener & Parker*
ATTORNEY

United States Patent Office 3,086,364
Patented Apr. 23, 1963

3,086,364
HYDROSTATIC POWER TRANSMISSIONS
Graham Desborough Page, Moseley, Birmingham, England, assignor to The Austin Motor Company Limited, Birmingham, England
Filed June 3, 1960, Ser. No. 33,797
1 Claim. (Cl. 60—52)

This invention relates to variable-ratio hydrostatic power transmissions (i.e. devices for transmitting power hydraulically from one or more positive displacement pumps to one or more positive displacement motors) of the type in which the working circuit, transmitting the power, is maintained primed at a positive pressure by one or more auxiliary pumps supplying a low-pressure circuit; and also in which an associated hydraulic control circuit is arranged to supply two or more feeds of hydraulic fluid to two or more hydraulic cylinders for the purpose of effecting a change of ratio.

The invention is particularly (although not exclusively) applicable to transmissions of the above type which have a rotor assembly into which the priming and ratio-changing feeds of hydraulic fluid have to be delivered from a stationary member. The difficulty entailed in transferring pressurized fluid from a stationary member to a rotating member, without excessive leakage, makes it desirable to reduce the number of these feeds to a minimum.

The principal hydraulic fluid feeds that are normally involved in a transmission of the type to which the invention relates are:

(a) The priming feed;
(b) The starting-pressure feed, which controls engagement of the drive;
(c) The "high" feed from the control circuit, e.g. from a governor, which supplies pressure-fluid to a cylinder (that is to say, the "high" cylinder) in order to change the ratio of the transmission towards the highest ratio or to hold the transmission in its highest ratio;
(d) The "low" feed which is delivered to a "low" cylinder in order to change the transmission towards the lowest ratio or to hold it in its lowest ratio; and
(e) The "reverse" feed which is supplied to a "reverse" cylinder for the purpose of changing into or out of reverse drive.

It will be appreciated that feed (e) is present only in transmissions which afford both forward and reverse drive, and which achieve reverse by variation of pump or motor displacement, or both, and not by the use of a separate reversing gear.

The invention resides in the elimination of a separate feed for priming the working circuit of the transmission, namely (a) above, and in making provision for enabling one or more of the feeds (c), (d) and (e) to be employed for the purpose of priming in addition to its or their normal function. This is achieved by including in the associated hydraulic control circuit pressure-responsive valve means effective to enable whichever of two or more ratio-changing hydraulic fluid feeds is at the higher (or highest) pressure at any time to function also as the priming feed for the working circuit.

Each of FIGURES 1 to 4 of the accompanying diagrammatic drawings exemplifies one of four different modes of applying the invention to a hydraulic control circuit of a variable-ratio hydrostatic power transmission (not shown) of the type specified in the opening paragraph of this specification.

Figure 5:
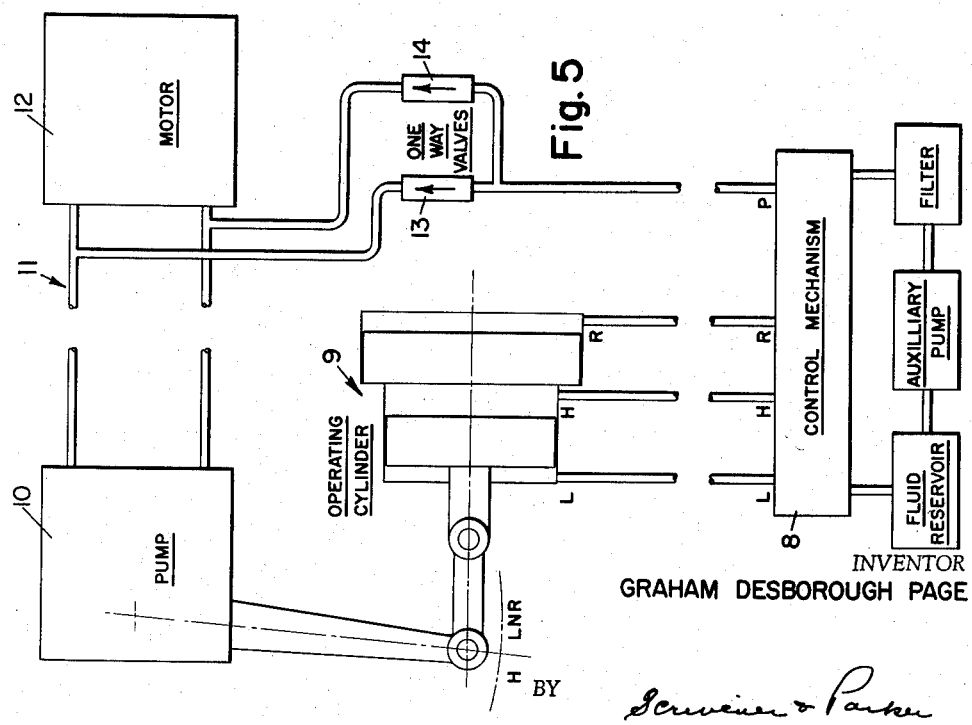

FIG. 5 is a schematic view of the conventional arrangement of variable-ratio hydrostatic power transmissions which require a separate feed for priming the working circuit, and FIG. 6 is a schematic view of one form of the invention wherein the separate priming feed is eliminated.

Since there are several ways in which the ratio-changing feeds (c), (d) and (e) referred to above may function, three chief cases A, B and C will be considered.

Case A

This is the case of a "forward and reverse" transmission in which the Reverse line (feeding the Reverse cylinder) is always pressurized when the transmission is in a forward ratio. In other words the Reverse line is pressurized to move the transmission out of reverse, or to prevent it changing into reverse. Also, the Low line (feeding the Low cylinder) is always pressurized when the transmission is in reverse ratio.

In one example of an arrangement enabling a separate priming line to be eliminated, two spring-loaded one-way valves V1 and V2 (FIG. 1) are employed. Their outlets 3 and 4 are interconnected and arranged to discharge into a line P to effect priming of the working circuit. The inlet 5 of the valve V1 is connected to the Low line L (which leads at LC to the Low cylinder), whereas the inlet 6 of the other valve V2 is connected to the Reverse line R (which leads at RC to the Reverse cylinder). This arrangement ensures that whichever of the lines L and R is at the higher pressure, is the line which also functions as the priming line. Thus, in forward drive (when the Reverse line R is always fully pressurized) the Reverse line R also acts as the priming line. Conversely, the Low line L acts as the priming line, when the transmission is in reverse. If, at any time, the Low and Reverse lines L and R are at the same pressure then hydraulic fluid is discharged by both of the one-way valves V1 and V2, so that both lines L and R act as priming lines. The line H is the High line, and leads at HC to the High cylinder.

An alternative method of achieving the same result is to replace the two one-way valves V1 and V2 of FIGURE 1 by a shuttle valve V as shown in FIGURE 2. However, this alternative should not be used if it is possible for the Low and Reverse line pressures to be identical in value, since in that event the shuttle valve V might stop in the midposition and blank off its outlet P for the priming feed.

Case B

In this case the Reverse line is pressurized only in reverse, and in forward drive the High and Low lines are pressurized alternately depending on whether the transmission is being held in, or changing towards, either high or low ratio. Also, when the transmission is in an intermediate ratio but not changing, the High and Low lines are at approximately the same pressure (this being less than the priming pump delivery pressure).

The two one-way valves V1 and V2 referred to above may also be employed in this case to obviate the need of a separate priming line, but these valves are now connected (see FIG. 3) between the High and Low lines. This arrangement may, if desired, be modified as shown in FIGURE 4 by employing a third one-way valve V3, which is associated with the Reverse line R and which has its outlet 7 connected to the outlets 3 and 4 of the other two valves, and to the outlet P for the priming feed. Consequently, with this arrangement, whichever of the Low, High and Reverse lines happens to have the highest hydraulic pressure at any time, serves also as the priming line.

Case C

The invention is equally applicable to a transmission the hydraulic circuit of which does not include a Reverse line, reverse drive (if available) being achieved by other means. In this case the same arrangement of the two one-way valves V1 and V2, associated with the Low and High lines respectively, may be employed as described in Case B, with reference to FIGURE 3.

Referring now to FIG. 5, the conventional arrangement is shown therein as including three lines (L, H, and R) for connecting the low pressure control mechanism 8 to the operating cylinder 9 for the purpose of changing the ratio of the transmission comprising pump 10, working circuit 11 and motor 12. In this case it will be observed that a separate priming line P is required for priming the working circuit 11 from the control mechanism 8 through one-way valves 13 and 14.

FIG. 6 represents the present invention as applied to Case A above and illustrated in FIG. 1, and includes the one-way valves V1 and V2 having their inlets 5 and 6 respectively connected with the lines L and R and having their outlets 3 and 4 respectively connected to the working circuit 11 through the check valves 13 and 14. This arrangement ensures that whichever of the lines L or R is at the higher pressure, is the line which also functions as the priming line. Thus, with the present invention, a separate feed for priming the working circuit of the transmission, such as that shown at P of FIG. 5, is entirely eliminated.

It will be appreciated from the foregoing description that, by making it possible to eliminate a separate priming feed, the invention results in the saving of a length of connecting line from the control mechanism of the transmission to its operating part. Further advantages are afforded by the invention when it is applied to transmissions of the type (mentioned earlier) in which the controlling feeds of pressure-fluid have to be transferred from a stationary member to a rotating one. With such an arrangement it is very advantageous to be able to reduce not only the number of feeds, and the number of sealing devices required between them, but also the size of the components through which the transfer of pressure-fluid takes place.

I claim:

A variable ratio hydrostatic power transmission having a positive displacement pump for transmitting power through a working circuit to a positive displacement motor, hydraulically operated means for effecting ratio changes of said pump, an auxiliary pump, a hydraulic control circuit for supplying at least two feeds of hydraulic fluid from said auxiliary pump to said hydraulically operated means for effecting said ratio changes, and means for priming said working circuit at a positive pressure from said auxiliary pump comprising a priming conduit connected with the working circuit, and means including pressure-responsive valve means to connect the priming conduit with either of the two hydraulic fluid feeds depending upon the pressures in the latter, said last named valve means comprising a pair of spring-loaded one-way valves having their respective inlets connected to the respective hydraulic fluid feeds, and having their outlets connected together and connected with the priming conduit.

References Cited in the file of this patent

UNITED STATES PATENTS

| | | |
|---|---|---|
| 2,384,962 | Pohl | Sept. 18, 1945 |
| 2,385,069 | Ferris | Sept. 18, 1945 |
| 2,493,512 | Vickers | Jan. 3, 1950 |
| 2,516,662 | Vickers et al. | July 25, 1950 |
| 2,773,452 | Berninger et al. | Dec. 11, 1956 |